(12) United States Patent
Jiang et al.

(10) Patent No.: US 8,699,852 B2
(45) Date of Patent: Apr. 15, 2014

(54) VIDEO CONCEPT CLASSIFICATION USING VIDEO SIMILARITY SCORES

(75) Inventors: Wei Jiang, Fairport, NY (US); Alexander C. Loui, Penfield, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 52 days.

(21) Appl. No.: 13/269,753

(22) Filed: Oct. 10, 2011

(65) Prior Publication Data

US 2013/0089304 A1 Apr. 11, 2013

(51) Int. Cl.
*H04N 5/92* (2006.01)

(52) U.S. Cl.
USPC ......................................................... 386/241

(58) Field of Classification Search
USPC ......................................................... 386/241
See application file for complete search history.

(56) References Cited

U.S. PATENT DOCUMENTS

| | | | |
|---|---|---|---|
| 6,915,011 B2 * | 7/2005 | Loui et al. | 382/224 |
| 7,813,822 B1 * | 10/2010 | Hoffberg | 700/94 |
| 2006/0107216 A1 * | 5/2006 | Cooper et al. | 715/724 |
| 2006/0110028 A1 * | 5/2006 | Liu et al. | 382/159 |
| 2008/0124042 A1 * | 5/2008 | Divakaran et al. | 386/52 |
| 2009/0299999 A1 * | 12/2009 | Loui et al. | 707/5 |
| 2011/0081082 A1 * | 4/2011 | Jiang et al. | 382/170 |
| 2012/0123780 A1 * | 5/2012 | Gao et al. | 704/245 |
| 2012/0301105 A1 * | 11/2012 | Rehg et al. | 386/241 |

OTHER PUBLICATIONS

Smeaton et al., "Evaluation Campaigns and TRECVid," Proc. 8th ACM International Workshop on Multimedia Information Retrieval, pp. 321-330 (2006).

Jiang et al., "Consumer video understanding: A benchmark database and an evaluation of human and machine performance," Proc. 1st ACM International Conference on Multimedia Retrieval (2011).

Cristani et al., "Audio-visual event recognition in surveillance video sequences," IEEE Transactions Multimedia, vol. 9, pp. 257-267 (2007).

Lowe, "Distinctive image features from scale-invariant keypoints," Int. Journal of Computer Vision, vol. 60, pp. 91-110 (2004).

Joly et al., "Efficient automatic analysis of camera work and micro-segmentation of video using spatiotemporal images," Signal Processing: Image Communication, vol. 8, pp. 295-307 (1996).

Cotton et al., "Soundtrack classification by transient events," IEEE Int. Conference on Acoustics, Speech and Signal Processing, pp. 473-476 (2011).

Granger, "Investigating causal relations by econometric models and cross-spectral methods," Econometrica, vol. 37, pp. 424-438 (1969).

Nedungadi et al., "Analyzing multiple spike trains with nonparametric granger causality," Journal of Computational Neuroscience, vol. 27, pp. 55-64 (2009).

(Continued)

*Primary Examiner* — Thai Tran
*Assistant Examiner* — William Tran

(57) ABSTRACT

A method for determining a semantic concept classification for a digital video clip, comprising: receiving an audio-visual dictionary including a plurality of audio-visual grouplets, the audio-visual grouplets including visual background and foreground codewords, audio background and foreground codewords, wherein the codewords in a particular audio-visual grouplet were determined to be correlated with each other; determining reference video codeword similarity scores for a set of reference video clips; determining codeword similarity scores for the digital video clip; determining a reference video similarity score for each reference video clip representing a similarity between the digital video clip and the reference video clip responsive to the audio-visual grouplets, the codeword similarity scores and the reference video codeword similarity scores; and determining one or more semantic concept classifications using trained semantic classifiers responsive to the determined reference video similarity scores.

26 Claims, 9 Drawing Sheets

(56) References Cited

OTHER PUBLICATIONS

Jiang et al., "Audio-visual atoms for generic video concept classification," ACM Transactions on Multimedia Computing, Communications and Applications, vol. 6, pp. 14:1-14:19 (2010).
Non-Final Office Action on U.S. Appl. No. 13/269,742, mailed Mar. 14, 2013.
Final Office Action on U.S. Appl. No. 13/269,742, mailed Aug. 13, 2013.
Non-Final Office Action on U.S. Appl. No. 13/269742, mailed Jan. 31, 2014.

\* cited by examiner

VIDEO CONCEPT CLASSIFICATION USING VIDEO SIMILARITY SCORES

CROSS-REFERENCE TO RELATED APPLICATIONS

Reference is made to commonly assigned, co-pending U.S. patent application Ser. No. 13/269,742, filed Oct. 10, 2011, entitled: "Video concept classification using audio-visual grouplets", by Jiang et al., which is incorporated herein by reference.

FIELD OF THE INVENTION

This invention pertains to the field of video classification and more particularly to a method for using an audio-visual grouplet representation to classify semantic concepts in videos.

BACKGROUND OF THE INVENTION

The rapidly increasing amount of digital multimedia data (e.g., digital still images and digital videos) makes the automatic classification of multimedia content an important problem. A wide range of semantic concepts can be used to represent multimedia content, such as objects (e.g., dog), scenes (e.g., beach) and events (e.g., birthday). Semantic concept classification in generic, unconstrained videos (e.g., videos captured by consumers and posted on YouTube) is a difficult problem, because such videos are captured in an unrestricted manner. These videos have diverse video content, as well as challenging conditions such as uneven lighting, clutter, occlusions, and complicated motions of both objects and camera.

A lot of effort has been devoted to developing methods to classify general semantic concepts in generic videos. Examples of proposed approaches include the TRECVid high-level feature extraction method described by Smeaton et al. in the article "Evaluation campaigns and TRECVid" (Proc. 8th ACM International Workshop on Multimedia Information Retrieval, pp. 321-330, 2006) and the Columbia Consumer Video (CCV) concept classification method described by Jiang et al. in the article "Consumer video understanding: A benchmark database and an evaluation of human and machine performance" (Proc. 1st ACM International Conference on Multimedia Retrieval, 2011).

Most prior art approaches classify videos in the same way they classify images, using mainly visual information. Specifically, visual features are extracted from either two-dimensional (2-D) keyframes or three-dimensional (3-D) local volumes, and these features are treated as individual static descriptors to train concept classifiers. Among these methods, the ones using the "Bag-of-Words" (BoW) representation over 2-D or 3-D local descriptors (e.g., SIFT) are considered state-of-the-art, due to the effectiveness of BoW features in classifying objects and human actions.

The importance of incorporating audio information to facilitate semantic concept classification has been discovered by several previous works. (For example, see the aforementioned article by Jiang et al. entitled "Consumer video understanding: A benchmark database and an evaluation of human and machine performance.") Such approaches generally use a multi-modal fusion strategy (e.g., early fusion to train classifiers with concatenated audio and visual features, or late fusion to combine judgments from classifiers built over individual modalities).

Cristani et al. in the article "Audio-visual event recognition in surveillance video sequences" (IEEE Transactions Multimedia, Vol. 9, pp. 257-267, 2007) describe a video classification method that integrates audio and visual information for scene analysis in a typical surveillance scenario. Visual information is analyzed to detect visual background and foreground information, and audio information is analyzed to detect audio background and foreground information. The integration of audio and visual data is subsequently performed by exploiting the concept of synchrony between such events.

There remains a need for a video classification method that better leverages temporal audio-visual correlation in order to provide more reliable and more efficient semantic classification.

SUMMARY OF THE INVENTION

The present invention represents a method for determining a semantic concept classification for a digital video clip including a temporal sequence of video frames and a corresponding audio soundtrack, comprising:

a) receiving an audio-visual dictionary including a plurality of audio-visual grouplets, the audio-visual grouplets including visual background codewords representing visual background content, visual foreground codewords representing visual foreground content, audio background codewords representing audio background content and audio foreground codewords representing audio foreground content, wherein the visual background codewords, the visual foreground codewords, the audio background codewords and audio foreground codewords in a particular audio-visual grouplet were determined to be correlated with each other during a training process based on an analysis of a plurality of training videos;

b) determining reference video codeword similarity scores for each reference video clip in a set of reference video clips by:
 i) analyzing the temporal sequence of video frames for a particular reference video clip to determine a set of reference video visual features;
 ii) analyzing the audio soundtrack for the particular reference video clip to determine a set of reference video audio features; and
 iii) determining the reference video codeword similarity scores for the particular reference video clip by comparing the set of reference video visual features to the visual background codewords and the visual foreground codewords and by comparing the set of reference video audio features to the audio background codewords and audio foreground codewords;

c) using a data processor to determine codeword similarity scores for the digital video clip by:
 i) analyzing the temporal sequence of video frames in the digital video clip to determine a set of visual features;
 ii) analyzing the audio soundtrack in the digital video clip to determine a set of audio features;
 iii) determining the codeword similarity scores for the digital video clip by comparing the set of visual features to the visual background codewords and the visual foreground codewords and by comparing the set of audio features to the audio background codewords and audio foreground codewords;

d) determining a reference video similarity score for each reference video clip representing a similarity between the digital video clip and the reference video clip responsive to the audio-visual grouplets, the codeword similarity scores and the reference video codeword similarity scores;

e) determining one or more semantic concept classifications using trained semantic classifiers responsive to the determined reference video similarity scores; and f) storing indications of the one or more semantic concept classifications in a processor-accessible memory.

This invention has the advantage that significant classification performance improvements can be achieved from the audio-visual grouplet (AVG) representation. Each AVG contains a set of audio and visual codewords that have strong temporal correlations in videos. The AVGs capture not only the individual audio and visual features carried by the discrete audio and visual codewords, but also the temporal relations between audio and visual channels. By using the entire AVGs as building elements to represent videos, various concepts can be more robustly classified than using discrete audio and visual codewords.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
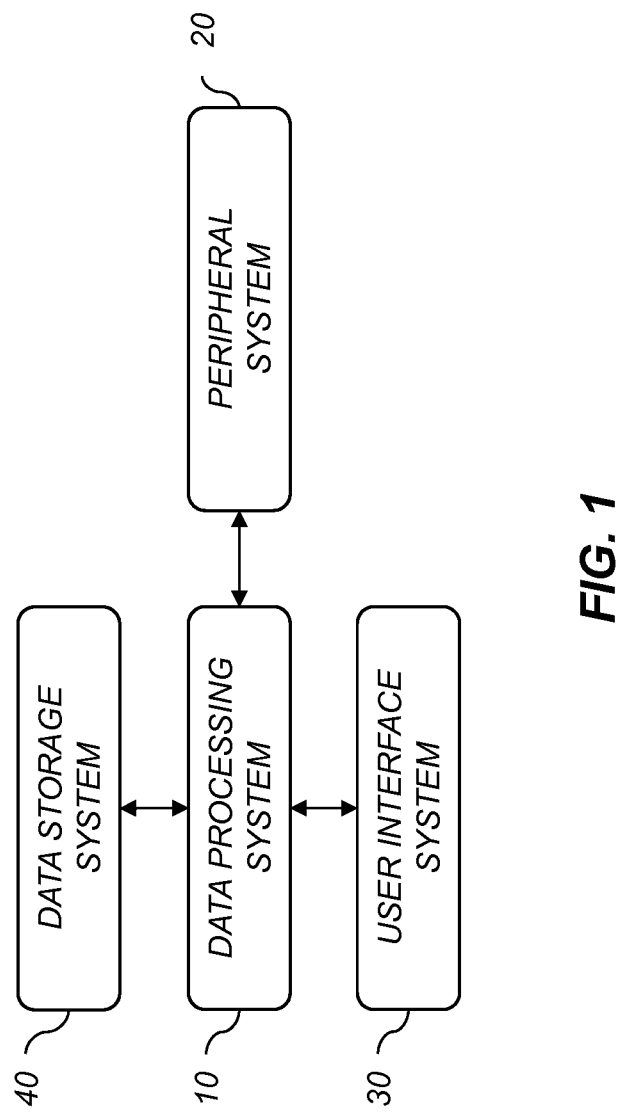
FIG. 1 is a high-level diagram showing the components of a system for determining a semantic concept classification for a digital video clip according to an embodiment of the present invention.

FIG. 1 is a high-level diagram showing the components of a system for determining a semantic concept classification according to an embodiment of the present invention. The system includes a data processing system 10, a peripheral system 20, a user interface system 30, and a data storage system 40. The peripheral system 20, the user interface system 30 and the data storage system 40 are communicatively connected to the data processing system 10.

The data processing system 10 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 40 includes one or more processor-accessible memories configured to store information, including the information needed to execute the processes of the various embodiments of the present invention, including the example processes described herein. The data storage system 40 may be a distributed processor-accessible memory system including multiple processor-accessible memories communicatively connected to the data processing system 10 via a plurality of computers or devices. On the other hand, the data storage system 40 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 40 is shown separately from the data processing system 10, one skilled in the art will appreciate that the data storage system 40 may be stored completely or partially within the data processing system 10. Further in this regard, although the peripheral system 20 and the user interface system 30 are shown separately from the data processing system 10, one skilled in the art will appreciate that one or both of such systems may be stored completely or partially within the data processing system 10.

The peripheral system 20 may include one or more devices configured to provide digital content records to the data processing system 10. For example, the peripheral system 20 may include digital still cameras, digital video cameras, cellular phones, or other data processors. The data processing system 10, upon receipt of digital content records from a device in the peripheral system 20, may store such digital content records in the data storage system 40.

The user interface system 30 may include a mouse, a keyboard, another computer, or any device or combination of devices from which data is input to the data processing system 10. In this regard, although the peripheral system 20 is shown separately from the user interface system 30, the peripheral system 20 may be included as part of the user interface system 30.

The user interface system 30 also may include a display device, a processor-accessible memory, or any device or combination of devices to which data is output by the data processing system 10. In this regard, if the user interface system 30 includes a processor-accessible memory, such memory may be part of the data storage system 40 even though the user interface system 30 and the data storage system 40 are shown separately in FIG. 1.

As discussed earlier, most prior art video classification methods that incorporate both video and audio information generally use a multi-modal fusion strategy which do not leverage temporal audio-visual correlation. The present invention takes advantage of the fact that temporal audio-visual dependencies can reveal unique audio-visual patterns to assist with automatic semantic concept classification. The correlations between temporal patterns of visual and audio codewords provide important discriminative audio-visual cues, such as the unique encapsulation of visual basketball patches and audio basketball bouncing sounds for classifying the "basketball" concept. Similarly, the encapsulation of visual stadium features and a audio music sounds can be used to classify a "music performance" concept. Such audio-visual cues have not been studied before in previous literatures.

From another perspective, beyond the traditional BoW representation, structured visual features have been recently found to be effective in many computer vision tasks. In addition to the local feature appearance, spatial relations among local patches are incorporated to increase the robustness of the visual representation. The rationale behind this is that individual local visual patterns tend to be sensitive to variations such as changes of illumination, views, scales, and occlusions. In comparison, a set of co-occurrent local patterns can be less ambiguous.

In accordance with the present invention, four types of Audio-Visual Grouplets (AVGs) are used to represent four types of temporal audio-visual correlations: correlations between visual foreground and audio foreground; correlations between visual background and audio background; correlations between visual foreground and audio background; and correlations between visual background and audio foreground. All of these types of AVGs are useful for video concept classification. For example, to effectively classify a "birthday" semantic concept, all of the following factors are important: the visual foreground (e.g., child), the visual background setting (e.g., cake and table), the audio foreground sound (e.g., cheering, birthday song, and hand clapping), and the audio background sound (e.g., music). By evaluating the temporal audio-visual correlations among these factors, we can identify unique audio-visual patterns that are discriminative for "birthday" classification.

To enable the exploitation of the foreground and background audio-visual correlations, coarse-level separation of the foreground and background is needed in both visual and audio channels. It is worth mentioning that due to the diverse video content and the challenging conditions (e.g., uneven lighting, clutter, occlusions, complicated objects and camera motions, and the unstructured audio sounds with overlapping acoustic sources), precise visual or audio foreground/background separation is not feasible in generic videos. In addition, exact audio-visual synchronization can be unreliable much of the time. Multiple moving objects usually make sounds together, and often the object making sounds does not synchronically appear in video.

To accommodate these issues, different from most previous audio-visual analysis methods such as the aforementioned method described by Cristani, et al. in the article "Audio-visual event recognition in surveillance video sequences," IEEE Transactions Multimedia, Vol. 9, pp. 257-267, 2007) that rely on precisely separated visual foreground objects and/or audio foreground sounds, the method of the present invention has the following characteristics:

Statistical temporal audio-visual correlations are evaluated over a set of videos instead of relying on the exact audio-visual synchronization in individual videos. By representing temporal sequences of visual and audio codewords as multivariate point processes, the statistical pair-wise nonparametric Granger causality between audio and visual codewords is analyzed. Based on the audio-visual causal matrix, salient AVGs are identified, which encapsulate strongly correlated visual and audio codewords as building blocks to classify videos.

The method does not rely on precise visual foreground/background separation. The aim is to build foreground-oriented and background-oriented visual vocabularies. In accordance with the present invention, consistent local points are tracked throughout each video. Based on both local motion vectors and spatiotemporal analysis of whole images, the point tracks are separated into foreground tracks and background tracks. Due to the challenging conditions of generic videos, such a separation is not precise. The goal is to maintain a majority of foreground (or background) tracks so that the constructed visual foreground (or background) vocabulary can capture mainly visual foreground (or background) information.

Similar to the visual aspect, the aim of audio processing is to build foreground-oriented and background-oriented audio vocabularies, instead of pursuing precisely separated audio foreground or background acoustic sources. In generic videos, the foreground sound events are typically distributed unevenly and sparsely. Therefore, a local representation that focuses on short-term transient sound events is used to capture the foreground audio information. Also, Mel-Frequency Cepstral Coefficients (MFCCs) extracted from uniformly spaced audio windows are used to roughly capture the overall information of the environmental sound. Based on the local representation and MFCCs, audio foreground and background vocabularies are constructed, respectively.

Figure 2:
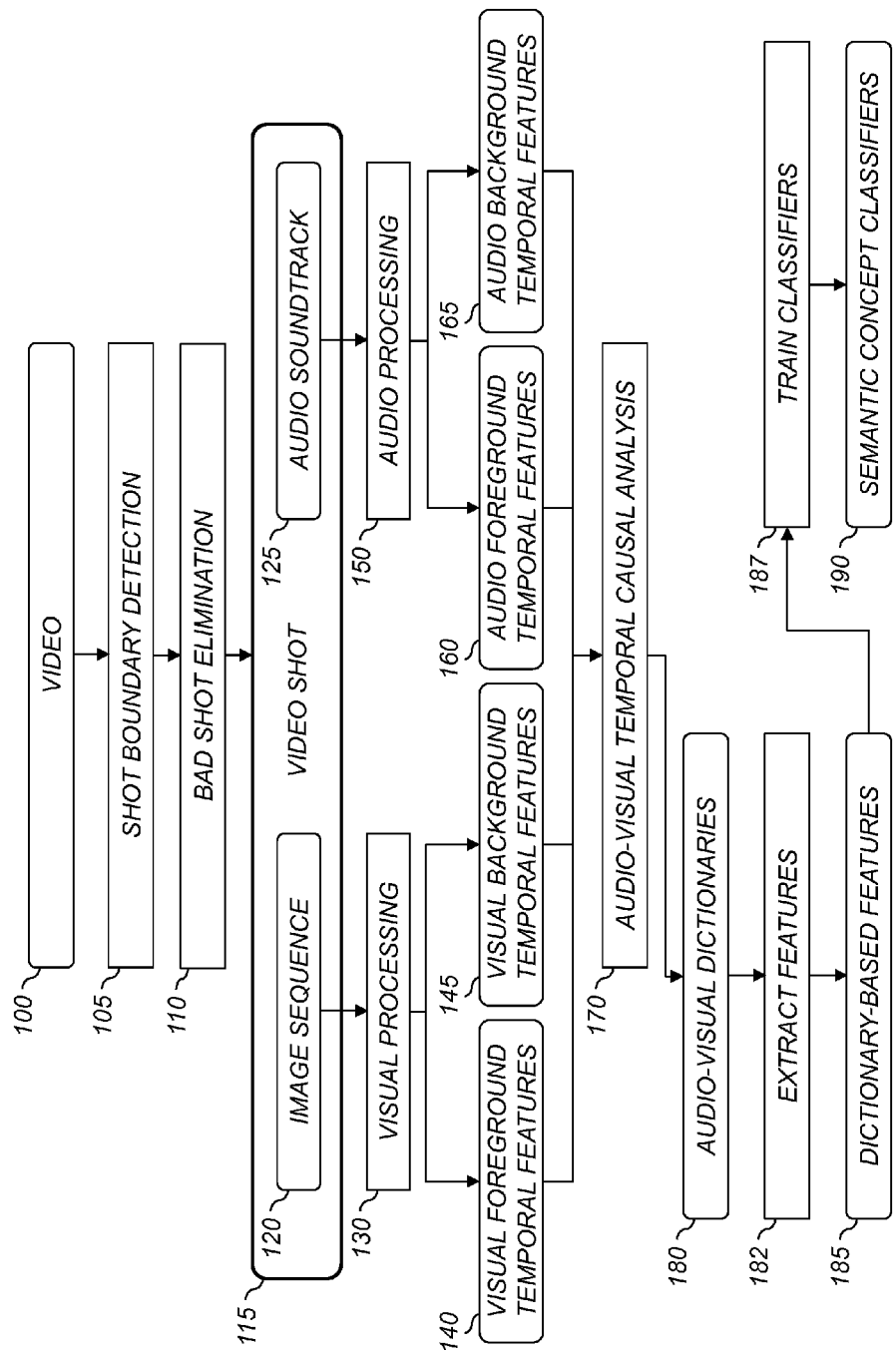
FIG. 2 is a flow diagram illustrating a method for forming audio-visual dictionaries and training semantic concept classifiers in accordance with the present invention.

The present invention will now be described with reference to FIGS. 2-8. FIG. 2 is a high-level flow diagram illustrating a preferred embodiment of a training process for determining audio-visual dictionaries 180 and training semantic concept classifiers 190 in accordance with the present invention.

Given an input video 100, some preprocessing steps are first conducted. A shot boundary detection step 105 is used to analyze the video 100 to detect shot boundaries between different scenes in the video 100, and to segment the video 100 into correspond parts, with a single shot in each part. A variety of methods for performing the shot boundary detection step 105 are known in the video analysis art, and any such method can be used in accordance with the present invention.

A bad shot elimination step 110 is used to detect video shots with very large camera motion, and eliminate them from the set of video shots so that they are excluded from further analysis. In some embodiments, other types of bad shots can also be detected and eliminated, such as out-of-focus shots and poorly illuminated shots. A variety of methods for performing the bad shot elimination step 110 are known in the video analysis art, and any such method can be used in accordance with the present invention.

The output of the preprocessing steps is a set of video shots 115 having relatively smooth motion that is used for further analysis. Each video shot 115 includes an image sequence 120 comprising a temporal sequence of video frames, together with a corresponding audio soundtrack 125.

A visual processing module 130 is used to automatically analyze the image sequence 120 to generate visual foreground temporal features 140 and visual background temporal features 145. Similarly, an audio processing module 150 is used to automatically analyze the audio soundtrack 125 to generate audio foreground temporal features 160 and audio background temporal features 165. Next, an audio-visual temporal causal analysis module 170 is applied to the audio and visual foreground and background features to generate audio-visual dictionaries 180.

An extract features step 182 is used to generate dictionary-based features 185 from the audio-visual dictionaries 180. A train classifiers step 187 is used to train semantic concept classifiers 190 based on the dictionary-based features 185. The semantic concept classifiers 190 are adapted to classify semantic concepts in videos. In a preferred embodiment, the semantic concept classifiers 190 are well-known Support Vector Machine (SVM) classifiers. Methods for training SVM classifiers are well-known in the image analysis art.

Figure 3:
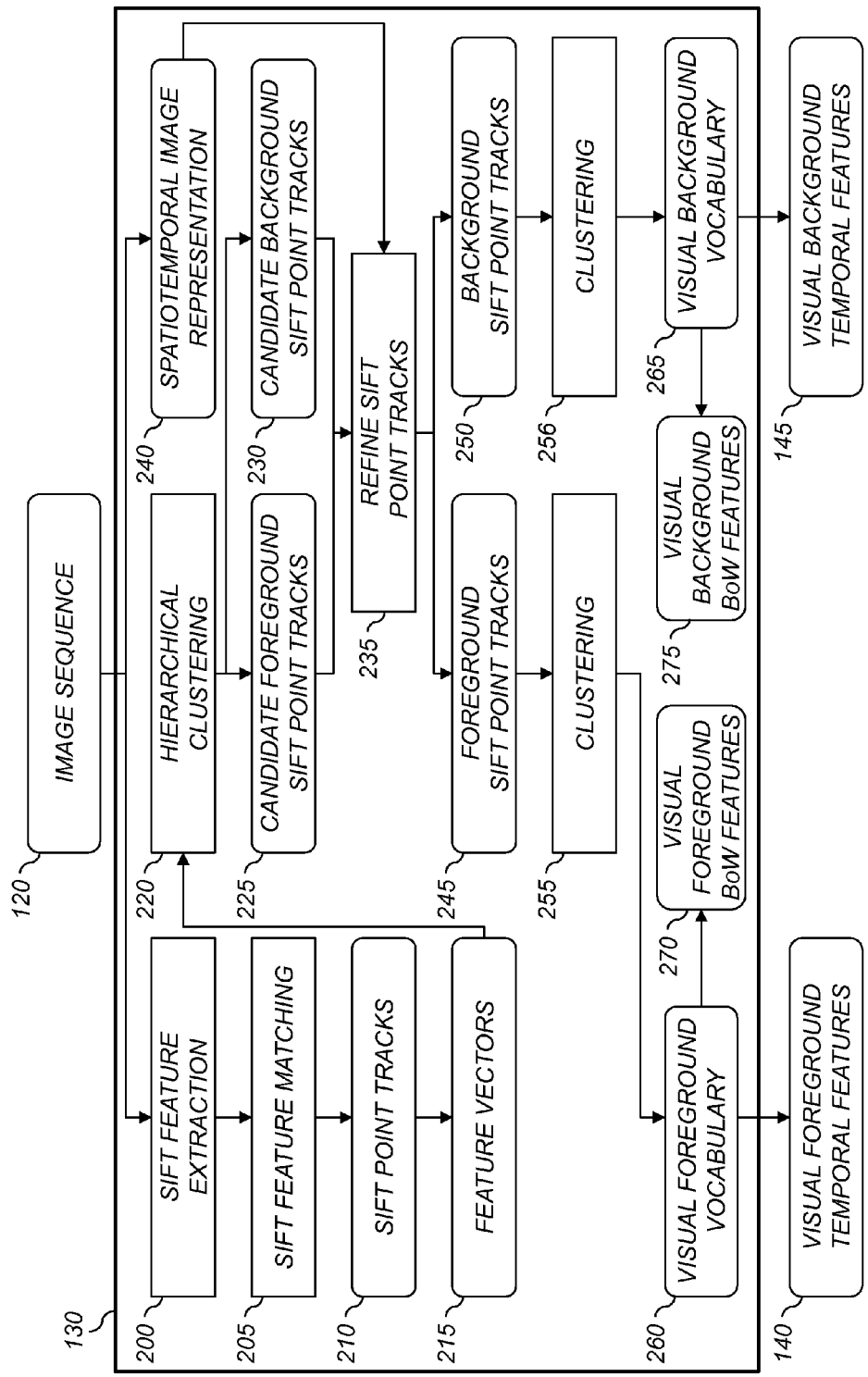
FIG. 3 shows a more detailed flow diagram of the visual processing module in FIG. 1 in accordance with a preferred embodiment.

Additional details for a preferred embodiment of the visual processing module 130 will now be discussed with reference to FIG. 3. Given the input image sequence 120, a SIFT feature extraction step 200 is used to extract a set of SIFT features from a set of uniformly sampled image frames from the image sequence. The image frames are sampled with a sampling rate of r fps (frames per second). The SIFT feature extraction step 200 can extract the SIFT features using any method known in the art. For example, in some embodiments, the 128-dim SIFT descriptor with the DoG interest point detector described by Lowe in the article "Distinctive image features from scale-invariant keypoints" (Int. Journal of Computer Vision, Vol. 60, pp. 91-110, 2004) can be used in accordance with the present invention.

Next, a SIFT feature matching step 205 is used to find pairs of matching SIFT features for adjacent image frames based on the Euclidean distance of their feature vectors. Ambiguous matches are discarded using the method described in the aforementioned article by Lowe. After that, the matching pairs are connected along the temporal dimension into a set of SIFT point tracks 210, where different SIFT point tracks 210 can start from different image frames and last variable lengths. The sampling rate r is empirically determined by considering both the computation cost and the ability of the SIFT feature matching operation. In general, increasing the sampling rate will decrease the chance of missing point tracks, with the price of increased computation.

Each SIFT point track 210 is represented by a feature vector 215. In one embodiment, the feature vectors 215 comprise a 128-dim SIFT vector concatenated with an 8-dim motion vector. The SIFT vector is the average of the SIFT features for all SIFT points in the corresponding SIFT point track 210. The motion vector is an averaged Histogram of Oriented Motion (HOM) determined along the track. That is, for each adjacent matching pair in the track, the speed and direction of the local motion vector are computed. By quantizing the 2-D motion space into 8 bins (corresponding to 8 directions), an 8-dim HOM feature is computed where the value over each bin is the averaged speed of the motion vectors from the track moving along this direction.

Once the set of SIFT point tracks 210 and the corresponding feature vectors 215 are obtained, the SIFT point tracks 210 can be separated as foreground or background using the following two steps. First, a hierarchical clustering step 220 is used to roughly separate the SIFT point tracks 210 into candidate foreground SIFT point tracks 225 and candidate background SIFT point tracks 230. This is accomplished by sequentially evaluating pairs of adjacent frames $I_i$ and $I_{i+1}$. Matching SIFT pairs corresponding to the SIFT point tracks 210 that are included in both of the adjacent frames are extracted and are clustered into candidate foreground SIFT pairs and background SIFT pairs based on the motion vectors. Specifically, the matching SIFT pairs are grouped using a hierarchical clustering process, where the grouping criterion is that SIFT pairs within a cluster have roughly the same moving direction and speed. Those SIFT pairs in the biggest cluster are treated as candidate background SIFT pairs, and all other SIFT pairs are treated as candidate foreground SIFT pairs. The rationale is that foreground moving objects usually occupy less than half of the entire screen, and points on the foreground objects do not have a very consistent moving pattern. In comparison, points on the static background generally have consistent motion and this motion is caused by camera motion.

After all the pairs of adjacent frames have been evaluated, some of the SIFT pairs corresponding to a particular SIFT point track 210 may have been labeled as candidate foreground SIFT pairs, while others may have been labeled as candidate background SIFT pairs. A "voting" process is then used to designate the particular SIFT point track 210 as either a candidate foreground SIFT point track 225 or a candidate background SIFT point track 230. In some embodiments, if more than predefined fraction (e.g., 50%) of the SIFT pairs for a particular SIFT point track 210 are labeled as candidate foreground SIFT pairs, then the particular SIFT point track 210 is designated as a candidate foreground SIFT point track 225, otherwise it is designated as a candidate background SIFT point track 230. The hierarchical clustering step 220 can distinguish background tracks fairly well for videos with moderate planar camera motions that occur most commonly in generic videos.

Next, a refine SIFT point tracks step 235 is used to further refine the candidate foreground SIFT point tracks 225 and the candidate background SIFT point tracks 230 to determine foreground SIFT point tracks 245 and background SIFT point tracks 250. In a preferred embodiment, the refine SIFT point tracks step 235 uses a spatiotemporal image representation 240 of the image sequence 120 to guide the refining process.

In some embodiments, the spatiotemporal image representation 240 is the so-called "X-ray" image representation described by Joly et al. in the article "Efficient automatic analysis of camera work and micro-segmentation of video using spatiotemporal images" (Signal Processing: Image Communication, Vol. 8, pp. 295-307, 1996). In the X-ray image representation, the average of each row and each column in successive image frames are computed. The distribution of the angles of edges in the X-ray image representations can be matched to camera work models, from which camera motion classification and temporal video segmentation can be obtained directly. When used alone, such methods cannot generate satisfactory segmentation results in many generic videos where large motions from multiple objects cannot be easily discriminated from the noisy background motion. The performance drops even more for small resolutions (e.g., 320×240 for many videos). Therefore, instead of using the spatiotemporal analysis method to pursue precise spatiotemporal object segmentation, it is used to refine the candidate foreground and background SIFT tracks. The spatiotemporal image representation 240 is able to capture camera zoom and tilt information, which the refine SIFT point tracks step 235 can use to rectify those candidate tracks that are mistakenly labeled as foreground due to camera zoom and tilt.

Based on the foreground SIFT point tracks 245 and the background SIFT point tracks 250, a visual foreground vocabulary 260 and a visual background vocabulary 265 can be built, respectively. Also, BoW features can be computed using the vocabularies, which can be used directly for concept classification. Additionally, the temporal patterns of codeword occurrences can be computed to study the correlations between audio and visual signals.

From the previous description, each of the foreground SIFT point tracks 245 and the background SIFT point tracks 250 is represented by a 136-dim feature vector 215. All foreground SIFT point tracks 245 from the training videos are collected together, based on which, a clustering step 255 is used to determine a D-codeword visual foreground vocabulary 260 ($V^{f-v}$). The clustering step 255 can use any clustering technique know in the art. In a preferred embodiment, the clustering step 255 uses a hierarchical K-means clustering method. Similarly, all background SIFT point tracks 250 from the training videos can be collected together and a clustering step 256 is used to construct a D-codeword visual background vocabulary 265 ($V^{b-v}$).

For each video $V_j$, all of its foreground SIFT point tracks 245 are matched to the visual foreground codewords. A soft weighting scheme can be used to alleviate the quantization effects, and D-dim visual foreground BoW features 270 ($F_j^{f-v}$) are generated. Similarly, all of the background SIFT point tracks 250 are matched to the visual background codewords to generate D-dim visual background BoW features 275 ($F_j^{b-v}$). In general, both $F_j^{f-v}$ and $F_j^{b-v}$ have their impacts in classifying concepts (e.g., both the foreground people with caps and gowns and the background stadium setting are useful to classify "graduation" videos).

To study the temporal audio-visual correlations, the following histogram feature is computed over time for each of the visual foreground vocabulary 260 and visual background vocabulary 265. Given a video $V_j$, a set of foreground SIFT point tracks 245 is obtained. Each foreground SIFT point track 245 is labeled with the visual foreground codeword in the visual foreground vocabulary 260 ($V^{f-v}$) that is closest to the track in the visual feature space. Next, for each frame $I_{ji}$ in the video, one can count the occurring frequency of each visual foreground codeword labeled to the foreground SIFT point tracks 245 that have a SIFT point falling in this frame, and a D-dim histogram $H_{ji}^{f-v}$ can be generated. Similarly, a D-dim histogram $H_{ji}^{b-v}$ can be generated for each image frame $I_{ji}$ based on the visual background vocabulary 265 ($V^{b-v}$). After this computation, for each video $V_j$, the visual foreground temporal feature 140 is obtained as $\{H_{j1}^{f-v}, H_{j2}^{f-v}, \ldots\}$. Similarly, the visual background temporal feature 145 is also obtained as $\{H_{j1}^{b-v}, H_{j2}^{b-v}, \ldots\}$.

Figure 4:
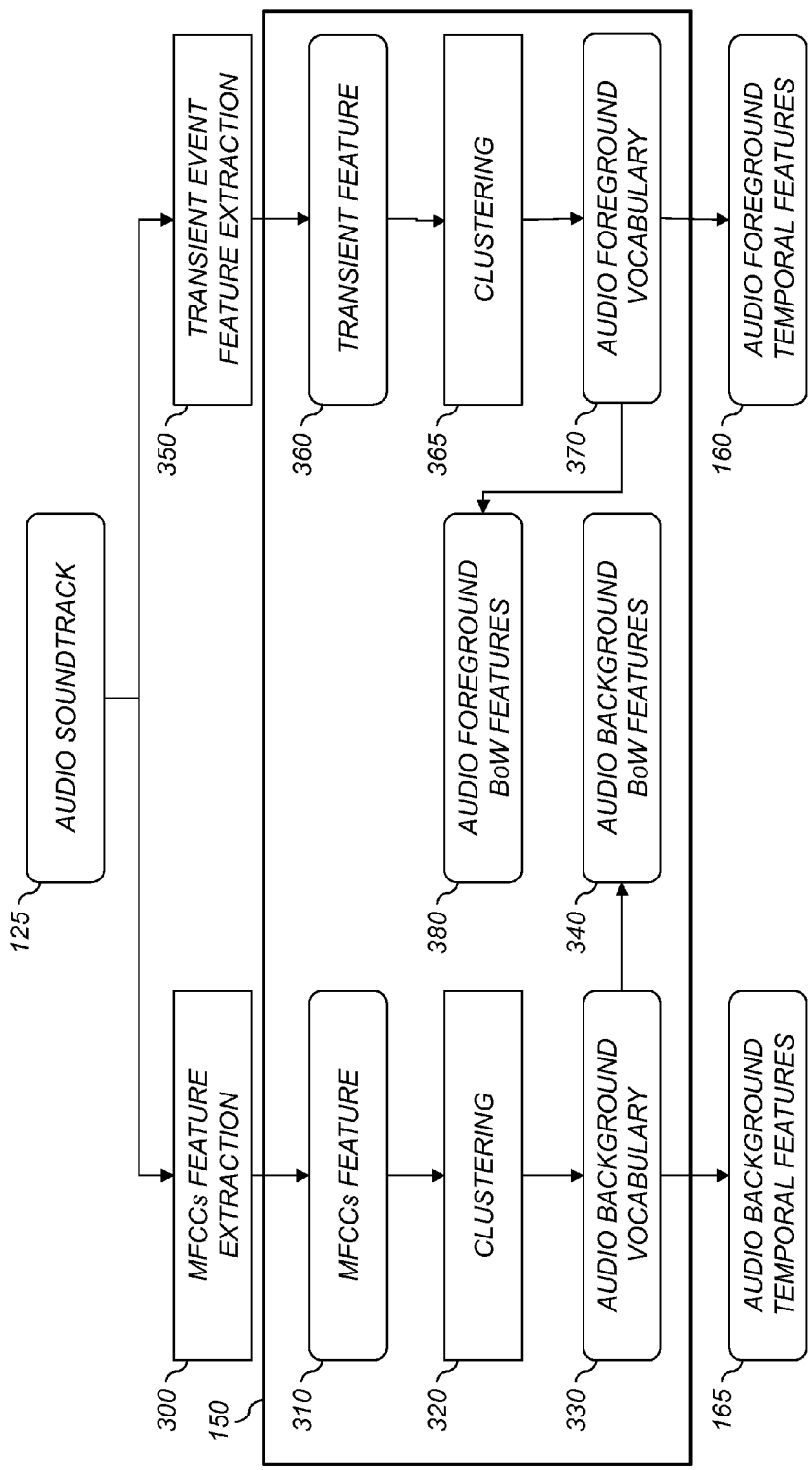
FIG. 4 shows a more detailed flow diagram of the audio processing module in FIG. 1 in accordance with a preferred embodiment.

Additional details for a preferred embodiment of the audio processing module 150 in FIG. 2 will now be discussed with reference to FIG. 4. At a high-level, instead of pursuing precisely separated audio sound sources, background-oriented and foreground-oriented audio features are generated. The temporal correlations of these features with their visual counterparts will be evaluated in later steps to generate useful audio-visual patterns for concept classification.

Various descriptors have been developed to represent audio signals in both temporal and spectral domains. Among these features, the well-known Mel-Frequency Cepstral Coefficients (MFCCs) feature is one of the most popular choices for many different audio recognition systems. MFCCs features represent the shape of the overall spectrum with a few coefficients, and have been shown to work well for both structured sounds (e.g., speech) and unstructured environmental sounds. In soundtracks of generic videos, the foreground sound events (e.g., an occasional dog barking or hand clapping) are distributed unevenly and sparsely. In such a case, the MFCCs feature extracted from uniformly spaced audio windows capture the overall characteristics of the background environmental sound, since the statistical impact of the sparse foreground sound events is quite small. Therefore, the MFCCs feature is used as the background audio feature.

For each given video $V_j$, an MFCC feature extraction step 300 is used to extract MFCCs feature 310 from the corresponding audio soundtrack 125 using uniformly spaced short windows (e.g., 25 ms windows with a hop size of 10 ms). The MFCCs feature 310 is represented as a 13-dim feature vector. Next, the MFCCs features 310 from all training videos are put together and a clustering step 320 is used to construct a D-word audio background vocabulary 330 ($V^{b-a}$). The clustering step 320 can use any clustering method known in the art. In a preferred embodiment, the clustering step 320 uses the well-known hierarchical K-means clustering method. Similar to visual-based processing, two different histogram-like features are computed based on $V^{b-a}$. First, audio background BoW features 340 ($F_j^{b-a}$) are generated for each video $V_j$ by matching the MFCCs features 310 in the video to codewords in the vocabulary and conducting soft weighting. The audio background BoW features 340 can be used directly for classifying concepts. Second, to study the audio-visual correlation, an audio background temporal feature 165 $\{H_{j1}^{b-a}, H_{j2}^{b-a}, \ldots\}$ is generated for each video $V_j$ as follows. Each MFCCs feature 310 is labeled with the codeword in the audio background vocabulary $V^{b-a}$ that is closest to the MFCCs feature 310. Next, for each sampled image frame $I_{ji}$ in the video, a 200 ms window centered on this frame is taken. The frequency of the codewords labeled to the MFCCs are then collected and used to generate a D-dim histogram $H_{ji}^{b-a}$. This $H_{ji}^{b-a}$ can be considered as temporally synchronized with the visual-based histograms $H_{ji}^{f-v}$ and $H_{ji}^{b-v}$.

A transient event feature extraction step 350 is used to extract a transient feature 360 from the audio soundtrack 125. As mentioned above, the audio soundtrack 125 of a generic video usually has unevenly and sparsely distributed foreground sound events. To capture such foreground information, local representations that focus on short-term local sound events should be used. The transient event feature extraction step 350 can use any transient event feature extraction method known in the art. In a preferred embodiment, the transient event feature extraction step 350 uses the method described by Cotton et al., in the article "Soundtrack classification by transient events" (IEEE Int. Conference on Acoustics, Speech and Signal Processing, pp. 473-476, 2011), which is incorporated herein by reference. According to this method, a local event-based representation is determined by locating a set of salient points in the soundtrack based on time-frequency energy analysis and multi-scale spectrum analysis. These salient points contain distinct event onsets (i.e., transient events). By modeling the local temporal structure around each transient event, an audio feature reflecting the foreground of the audio soundtrack 125 can be computed for use as the transient feature 360.

More specifically, an Automatic Gain Control (AGC) is first applied to equalize the audio energy in both time and frequency domains. Next, the spectrogram of the AGC-equalized signal is taken for a number of different time-frequency tradeoffs, corresponding to window length between 2 to 80 ms. Multiple scales enable the localization of events of different durations. High-magnitude bins in any spectrogram indicate a candidate transient event at the corresponding time. A limit is empirically set on the minimum distance between successive events to produce 4 events per second on average. A 250 ms window of the audio signal is extracted centered on each transient event time, which captures the temporal structure of the transient event. Within each 250 ms window, a 40-dim spectrogram-based feature is computed for short-term signals (e.g., over 25 ms windows with 10 ms hops). These features from multiple short-term signals are concatenated together to form a spectrogram-based representation for each transient event. After that, PCA is performed over all transient events from all training videos, and the top 20 bases are used to project the original spectrogram-based event representation to 20 dimensions.

All of the transient features 360 from all training videos are collected and a clustering step 365 is used to construct a D-word audio foreground vocabulary 370 ($V^{f-a}$). Again, two different histogram-like features are computed based on $V^{f-a}$. First, audio foreground BoW features 380 ($F_j^{f-a}$) are generated for each video $V_j$ by matching the transient features in the video to codewords in the vocabulary and conducting soft weighting. Second, an audio foreground temporal feature 160 $\{H_{j1}^{f-a}, H_{j2}^{f-a}, \ldots\}$ is generated for each video $V_j$ as follows. Each transient event is labeled with the codeword in the audio foreground vocabulary $V^{f-a}$ that is closest to the transient event feature. Next, for each sampled image frame $I_{ji}$ in the video, a 200 ms window centered on this frame is taken. The frequency of the codewords labeled to the transient events whose centers fall into this window are collected and used to generate a D-dim histogram $H_{ji}^{f-a}$. Similar to $H_{ji}^{f-a}$ can be considered as synchronized with $H_{ji}^{f-v}$ or $H_{ji}^{b-v}$.

Figure 5:
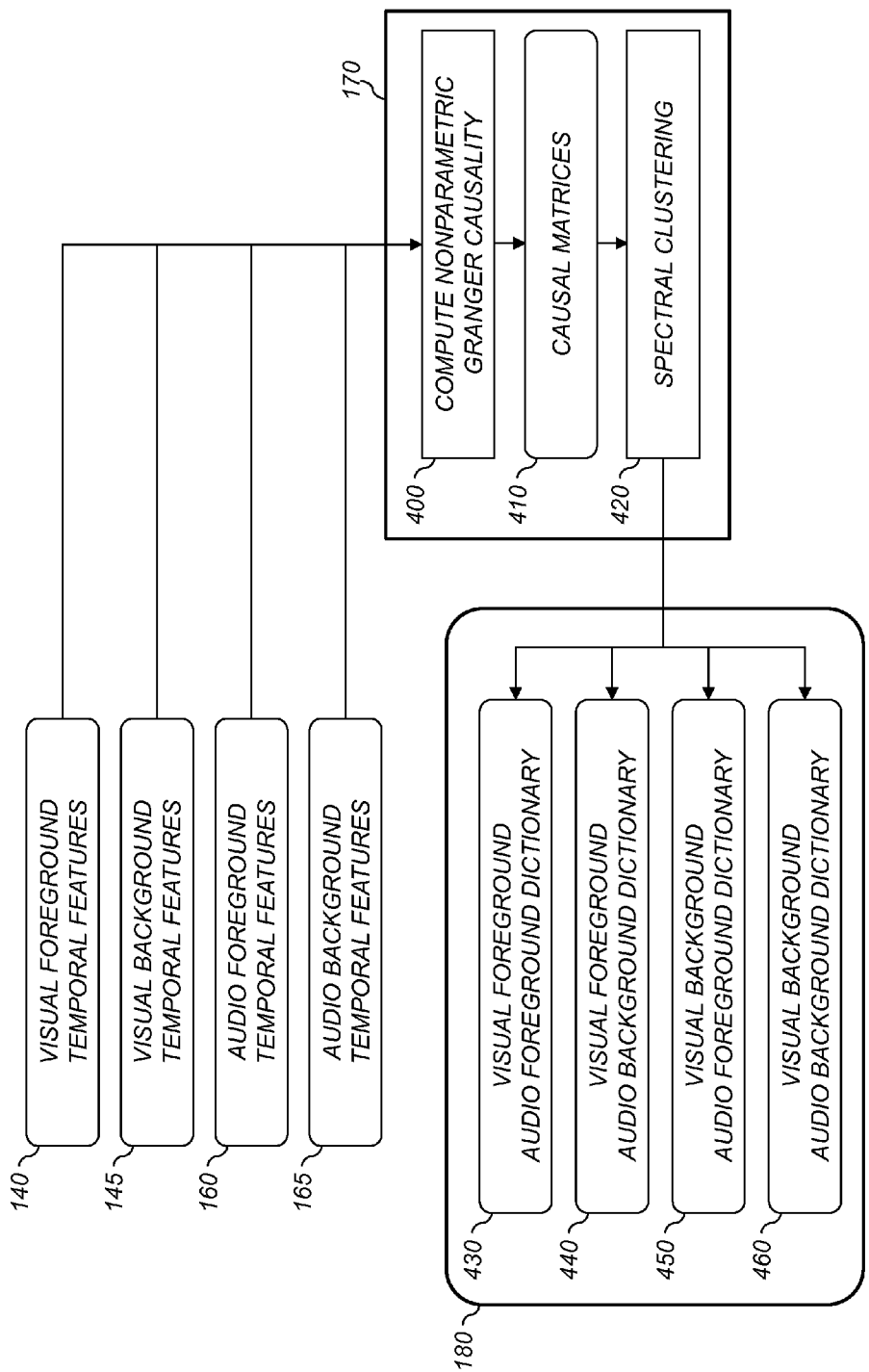
FIG. 5 shows a more detailed flow diagram of the audio-visual temporal causal analysis module in FIG. 1 in accordance with a preferred embodiment.

Additional details for a preferred embodiment of the audio-visual temporal causal analysis module 170 will now be discussed with reference to FIG. 5. The goal is to capture the co-occurrences of audio and visual patterns over time. The rough foreground/background separation of both temporal SIFT point tracks and audio sounds enables a meaningful study of such temporal relations. For the purpose of classifying general concepts in generic videos, all of the following factors have their contributions: foreground visual objects, foreground audio transient events, background visual scenes, and background environmental sounds. Therefore, their mixed-and-matched temporal relations are explored to find salient AVGs that can assist the final classification. From the previous sections, for each video $V_j$, there are four features: visual foreground temporal feature 140 $\{H_{j1}^{f-v}, H_{j2}^{f-v}, \ldots\}$, audio foreground temporal feature 160 $\{H_{j1}^{f-a}, H_{j2}^{f-a}, \ldots\}$, visual background temporal feature 145 $\{H_{j1}^{b-v}, H_{j2}^{b-v}, \ldots\}$, and audio background temporal feature 165 $\{H_{j1}^{b-a}, H_{j2}^{b-a}, \ldots\}$, with four corresponding vocabularies: visual foreground vocabulary 260 ($V^{f-v}$), audio foreground vocabulary 370 ($V^{f-a}$), visual background vocabulary 265 ($V^{b-v}$), and audio background vocabulary 330 ($V^{b-a}$).

For each vocabulary, (e.g., the visual foreground vocabulary 260) each codeword $w_k$ in the vocabulary can be treated as a point process, $N_k^{f-v}(t)$, which counts the number of occurrences of $w_k$ in the interval (0, t]. The number of occurrences of $w_k$ in a small interval dt is $dN_k^{f-v}(t)=N_k^{f-v}(t+dt)-N_k^{f-v}(t)$, and $E\{N_k^{f-v}(t)\}=\lambda_k^{f-v}$ is the mean intensity. For theoretical and practical convenience, the zero-mean process is considered, and $N_k^{f-v}(t)$ is assumed as wide-sense stationary, mixing, and orderly. Point processes generated by all D codewords of vocabulary $V^{f-v}$ form a D-dim multivariate point process $N^{f-v}(t)=(N_1^{f-v}(t), \ldots, N_D^{f-v}(t))T$. Each video $V_j$ gives one realization (trial) of $N^{f-v}(t)$ with counting vector $(h_{j1}^{f-v}(t), h_{j2}^{f-v}(t), \ldots, h_{jD}^{f-v}(t))T$, where $h_{jk}^{f-v}(t)$ is the value over the k-th bin of the histogram $H_{jk}^{f-v}$. Similarly, D-dim multivariate point processes $N^{f-a}(t)$, $N^{b-v}(t)$, and $N^{b-a}(t)$ can be generated for vocabularies $V^{f-a}$, $V^{b-v}$, and $V^{b-a}$, respectively.

Granger causality is a type of statistical temporal causality and is a statistical measure based on the concept of time series forecasting, where a time series $Y_1$ is considered to causally influence a time series $Y_2$ if predictions of future values of $Y_2$ based on the joint history of $Y_1$ and $Y_2$ are more accurate than predictions based on $Y_2$ alone (see: Granger "Investigating causal relations by econometric models and cross-spectral methods," Econometrica, Vol. 37, pp. 424-438, 1969). The estimation of Granger causality usually relies on autoregressive models, and for continuous-valued data such model fitting is straightforward. In an article entitled "Analyzing multiple spike trains with nonparametric granger causality" (Journal of Computational Neuroscience, Vol. 27, pp. 55-64, 2009), which is incorporated herein by reference, Nedungadi et al. have described a nonparametric method that has been developed which bypasses the autoregressive model fitting to estimate Granger causality for point processes. The theoretical basis lies in the spectral representation of point processes, the factorization of spectral matrices, and the formulation of Granger causality in the spectral domain. In a preferred embodiment, a compute nonparametric Granger causality step 400 is used to compute causal matrices 410 representing the temporal causality between audio and visual codewords using the aforementioned method of Nedungadi et al. The following details this process. For simplicity, those indexes f-v, b-v, f-a, and b-a, are temporarily omitted, without loss of generality, since Granger causality can be computed for any two codewords from any vocabularies.

The pair wise statistical relation between two point processes $N_k(t)$ and $N_l(t)$ can be captured by the cross-covariance density function $R_{kl}(u)$ at lag u:

$$R_{kl}(u) = \frac{E\{dN_k(t+u)dN_l(t)\}}{dudt} - I[N_k(t) = N_l(t)]\lambda_k\delta(u) \qquad (1)$$

where $\delta(u)$ is the classical Kronecker delta function, and $I[\bullet]$ is the indicator function. By taking the Fourier transform of $R_{kl}(u)$, we obtain the cross-spectrum $S_{kl}(f)$. Specifically, the multitaper method can be used to compute the spectrum, where M data tapers $\{q_m\}^M_{m=1}$ are applied successively to point process $N_k(t)$ (with length T):

$$S_{kl}(f) = \frac{1}{2\pi MT} \sum_{m=1}^{M} \tilde{N}_k(f,m)\tilde{N}_l(f,m)^*, \qquad (2)$$

where $$\tilde{N}_k(f,m) = \sum_{t_p=1}^{T} q_m(t_p) N_k(t_p) \exp(-2\pi i f t_p). \qquad (3)$$

The superscript "*" is the complex conjugate transpose. Eq. (2) gives an estimation of the cross-spectrum using one realization, and such estimations of multiple realizations are averaged to give the final estimation of the cross-spectrum.

For multivariate continuous-valued time series $Y_1$ and $Y_2$ with joint autoregressive representations:

$$Y_1 = \sum_{p=1}^{\infty} a_p Y_1(t-p) + \sum_{p=1}^{\infty} b_p Y_2(t-p) + \varepsilon(t), \qquad (4a)$$

$$Y_2 = \sum_{p=1}^{\infty} c_p Y_2(t-p) + \sum_{p=1}^{\infty} d_p Y_1(t-p) + \eta(t), \qquad (4b)$$

their noise terms are uncorrelated over time and their contemporaneous covariance matrix is:

$$\Sigma = \begin{bmatrix} \Sigma_2 & \Psi_2 \\ \Psi_2 & \Gamma_2 \end{bmatrix}, \qquad (5)$$

where $\Sigma_2 = \text{var}(\varepsilon(t))$, $\Gamma_2 = \text{var}(\eta(t))$ and $\Psi_2 = \text{cov}(\varepsilon(t), \eta(t))$. The spectral matrix can be computed as:

$$S(f) = \begin{bmatrix} S_{11}(f) & S_{12}(f) \\ S_{21}(f) & S_{22}(f) \end{bmatrix} = H(f)\Sigma H(f)^*, \qquad (6)$$

where:

$$H(f) = \begin{bmatrix} H_{11}(f) & H_{12}(f) \\ H_{21}(f) & H_{22}(f) \end{bmatrix} \qquad (7)$$

is the transfer function depending on coefficients of the autoregressive model. The spectral matrix $S(f)$ of two point processes $N_k(t)$ and $N_l(t)$ can be estimated using Eq. (2). By spectral matrix factorization we can decompose $S(f)$ into a unique corresponding transfer function $H'(f)$ and noise processes $\Sigma'_2$ and $\Gamma'_2$.

Next, the Granger causality at frequency f can be estimated as:

$$G_{N_l \to N_k}(f) = \ln \frac{S_{kk}(f)}{H'_{kk}(f)\Sigma'_2 H'_{kk}(f)^*}, \qquad (8)$$

$$G_{N_k \to N_l}(f) = \ln \frac{S_{ll}(f)}{H'_{ll}(f)\Gamma'_2 H'_{ll}(f)^*}. \qquad (9)$$

The Granger causality scores over all frequencies are then summed together to obtain a single time-domain causal influence, i.e., $$C_{N_l \to N_k} = \sum_f G_{N_l \to N_k}$$

and $$C_{N_k \to N_l} = \sum_f G_{N_k \to N_l}.$$

In general, $C_{N_l \to N_k} \neq C_{N_k \to N_l}$, due to the directionality of the causal relations.

The target of studying temporal causality between audio and visual codewords in this invention is to identify strongly correlated AVGs, where the direction of the relations is usually not important. For example, a dog can start barking at any time during the video, and one would like to find the AVG that contains correlated codewords describing the foreground dog barking sound and the visual dog point tracks. The direction of whether the barking sound is captured before or after the visual tracks is irrelevant. Therefore, for a pair of codewords represented by point processes $N_k^{S_k}(t)$ and $N_l^{S_l}(t)$ (where $s_k$ or $s_l$ is one of the following f-v, f-a, b-v, and b-a, indicating the vocabularies the codeword comes from), the nonparametric Granger causality scores from both directions $C_{N_l \to N_k}$ and $C_{N_k \to N_l}$ are summed together to generate the final similarity between these two codewords:

$$C(N_k^{S_k}, N_l^{S_l}) = C_{N_k \to N_l} + C_{N_l \to N_k} \qquad (10)$$

Then, for a pair of audio and visual vocabularies, e.g., $V^{f-v}$ and $V^{f-a}$, we have a 2D×2D symmetric causal matrix 410:

$$\begin{bmatrix} C^{f-v,f-v} & C^{f-v,f-a} \\ C^{f-a,f-v} & C^{f-a,f-a} \end{bmatrix}, \qquad (11)$$

where $C^{f-v,f-v}$, $C^{f-a,f-a}$, and $C^{f-v,f-a}$ are D×D matrices with entries $C(N_k^{f-v}, N_l^{f-v})$, $C(N_k^{f-a}, N_l^{f-a})$, and $C(N_k^{f-v}, N_l^{f-a})$, respectively.

A spectral clustering step 420 can be applied directly based on the causal matrices 410 to identify clusters of codewords that have high correlations. Each resulting cluster is called an AVG, and codewords in an AVG can come from both audio and visual vocabularies. The AVGs capture temporally correlated audio and visual codewords that statistically interact over time. Each AVG can be treated as an audio-visual pattern, and all AVGs form an audio-visual dictionary. For a given video $V_j$, the original SIFT point tracks and audio features can be mapped to AVGs and generate an audio-visual dictionary-based feature. The simplest way to compute this dictionary-based feature is to aggregate the original BoW features over individual visual and audio vocabularies. For instance, for an AVG containing codewords $w_1^{f-a}, \ldots, w_n^{f-a}$ from $V^{f-a}$, and $w_1^{f-v}, \ldots, w_m^{f-v}$ from $V^{f-v}$, the value over the corresponding bin in the dictionary-based feature of video $V_j$ is:

$$\sum_{p=1}^{n} F_{jp}^{f-a} + \sum_{p=1}^{m} F_{jp}^{f-v} \cdot F_{jp}^{f-a}$$

(or $F_{jp}^{f-v}$) is the value over the p-th bin in the audio foreground BoW features 380 ($F_j^{f-a}$) (or the visual foreground BoW features 270 ($F_j^{f\text{-}v}$) over the audio foreground vocabulary 370 ($V^{f\text{-}a}$) (or the visual foreground vocabulary 260 ($V^{f\text{-}v}$). Classifiers such as the well-known Support Vector Machine (SVM) classifiers can be trained using this feature for concept classification.

In a preferred embodiment, a total of four audio-visual dictionaries 180 are generated by analyzing the temporal causal relations between different types of audio and visual codewords. They are: a visual foreground audio foreground dictionary 430 ($D^{f\text{-}v,f\text{-}a}$) formed by correlating the visual foreground vocabulary 260 ($V^{f\text{-}v}$) and the audio foreground vocabulary 370 ($V^{f\text{-}a}$), a visual background audio background dictionary 460 ($D^{b\text{-}v,b\text{-}a}$) formed by correlating the visual background vocabulary 265 ($V^{b\text{-}v}$) and the audio background vocabulary 330 ($V^{b\text{-}a}$), a visual foreground audio background dictionary 440 ($D^{f\text{-}v,b\text{-}a}$) formed by correlating the visual foreground vocabulary 260 ($V^{f\text{-}v}$) and the audio background vocabulary 330 ($V^{b\text{-}a}$), and a visual background audio foreground dictionary 450 ($D^{b\text{-}v,f\text{-}a}$) formed by correlating the visual background vocabulary 265 ($V^{b\text{-}v}$) and the audio foreground vocabulary 370 ($V^{f\text{-}a}$). All of these correlations reveal useful audio-visual patterns for classifying semantic concepts.

The individual audio-visual dictionaries 180 can be directly used to train classifiers for detecting semantic concepts. Also, these audio-visual dictionaries 180 can be combined (i.e., the dictionary-based features can be concatenated into a long vector) to train the semantic concept classifiers 190.

A preferred embodiment of a method for determining a semantic concept classification for an input video 500 including a temporal sequence of image frames 505 and a corresponding audio soundtrack 510 will now be discussed with reference to FIG. 6. SIFT features 520 are extracted from a set of sampled image frames selected from the image frames 505 (e.g., uniformly sampled image frames) using the earlier described SIFT feature extraction step 200. The sampling rate is determined by considering both the computation cost and the representativeness of images to cover the video content. In addition to the SIFT features 520, motion features 525 represented by an HOM motion feature vector is computed over each extracted SIFT interest point using a motion feature extraction step 515. The SIFT features 520 and the corresponding motion features 525 are concatenated to provide visual features 540 that describes each local SIFT interest point.

Relative to the audio soundtrack 510, MFCCs features 530 represented by a 13-dim MFCCs feature vector is extracted from the audio soundtrack 510 using the earlier described MFCC feature extraction step 300 using uniformly spaced short windows (e.g., 25 ms windows with a hop size of 10 ms). Also, transient features 535 are determined using the earlier described transient event feature extraction step 350.

D-dim visual foreground BoW features 545 are generated by matching the visual features 540 to codewords in the visual foreground vocabulary 260. In a preferred embodiment, the visual foreground BoW features 545 are generated in an analogous manner to the method used to compute the visual foreground BoW features 270 described earlier, where a soft weighting scheme is also used to alleviate the quantization effects. Likewise, visual background BoW features 550 are generated by matching the visual features 540 to codewords in the visual background vocabulary 265; audio foreground BoW features 555 are generated by matching the audio transient features 535 to codewords in the audio foreground vocabulary 370; and audio background BoW features 560 are generated by matching the MFCCs features 530 to codewords in the audio background vocabulary 330.

By using the visual foreground BoW features 545, the visual background BoW features 550, the audio foreground BoW features 555, and the audio background BoW features 560, dictionary-based similarity scores 565 can be computed based on the audio-visual dictionaries 180 (i.e., similarity scores based on the visual foreground audio foreground dictionary 430 ($D^{f\text{-}v,f\text{-}a}$), similarity scores based on the visual background audio background dictionary 460 ($D^{b\text{-}v,b\text{-}a}$), similarity scores based on the visual foreground audio background dictionary 440 ($D^{f\text{-}v,b\text{-}a}$), and similarity scores based on the visual background audio foreground dictionary 450 ($D^{b\text{-}v,f\text{-}a}$)). Each dictionary-based similarity score 565 indicates the similarity between the input video 500 and the AVGs in the various audio-visual dictionaries. Then the dictionary-based similarity scores 565 can be fed into a concept classification step 570 which applies the semantic concept classifiers 190 to determine a semantic concept 580 for the input video 500.

Figure 7A:
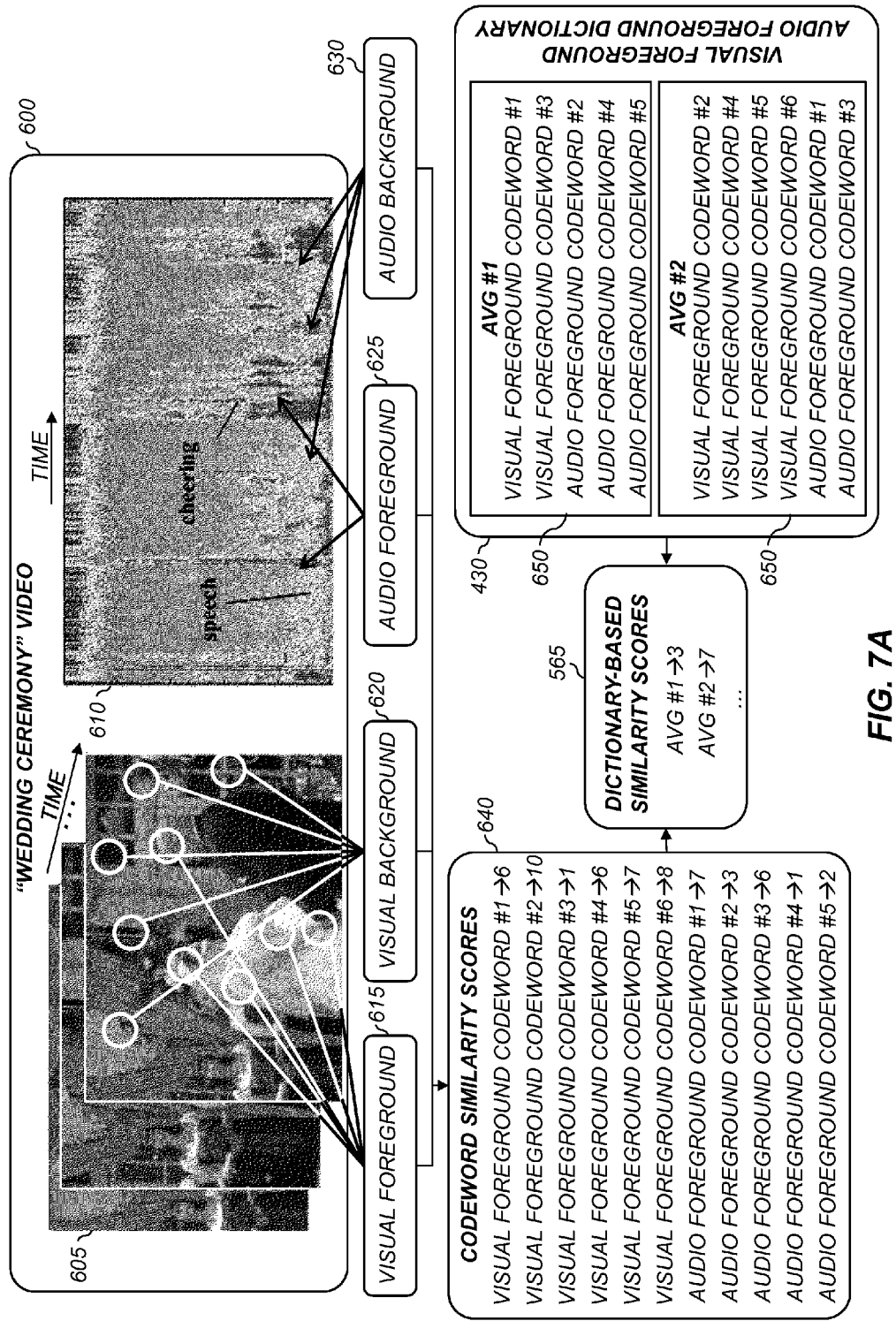
FIG. 7A is an example illustrating the structure of audio-visual grouplets from an audio-visual dictionary and the computation of dictionary-based similarity scores.

The dictionary-based similarity scores 565 can be determined in a variety of ways in accordance with the present invention. One such method is illustrated in FIG. 7A, which shows a set of AVGs 650 in one of the audio-visual dictionaries 180 (FIG. 5)—specifically, AVGs 650 from the visual foreground audio foreground dictionary 430 that were constructed by correlating the visual foreground vocabulary 260 (FIG. 3) and the audio foreground vocabulary 370 (FIG. 4). Each AVG 650 contains a set of visual foreground and audio foreground codewords. The structures of other types of AVGs (i.e., the AVGs from the visual foreground audio background dictionary 440, the AVGs from the visual background audio foreground dictionary 450, and the AVGs from the visual background audio background dictionary 460) have forms similar to the example AVGs 650 illustrated for the visual foreground audio foreground dictionary 430, where the visual and audio codewords are either foreground or background codewords as appropriate.

In the illustrated example, an input wedding ceremony video clip 600 includes a time sequence of image frames 605 and a corresponding audio soundtrack 610. The image frames 605 include various visual foreground 615 elements (e.g., the bride and groom) and visual background 620 elements (e.g., curtains and windows). Similarly, the audio soundtrack 610 includes audio foreground 625 elements (e.g., speech and cheering), as well as audio background 630 elements.

A set of codeword similarity scores 640 are determined corresponding to the visual and audio features extracted from the video clip 600. As was discussed relative to FIG. 6, the image frames 605 are analyzed to determine visual foreground BoW features 545 (FIG. 6) corresponding to visual foreground codewords in the visual foreground vocabulary 260 (FIG. 6). Similarity scores are determined for each of the visual foreground codewords providing an indication of the similarity between the visual foreground 615 feature in the image frames 605 and the visual foreground codewords in the visual foreground vocabulary 260 (e.g., visual foreground codeword #1 is assigned a similarity score of "6" in the example shown in FIG. 7A). Each codeword similarity score 640 for a visual foreground 615 feature gives the value of the corresponding bin in the visual foreground BoW feature 545 (FIG. 5) For example, the bin corresponding to visual foreground codeword #1 in the visual foreground BoW feature 545 has value "6" in the illustrated example.

Figure 6:
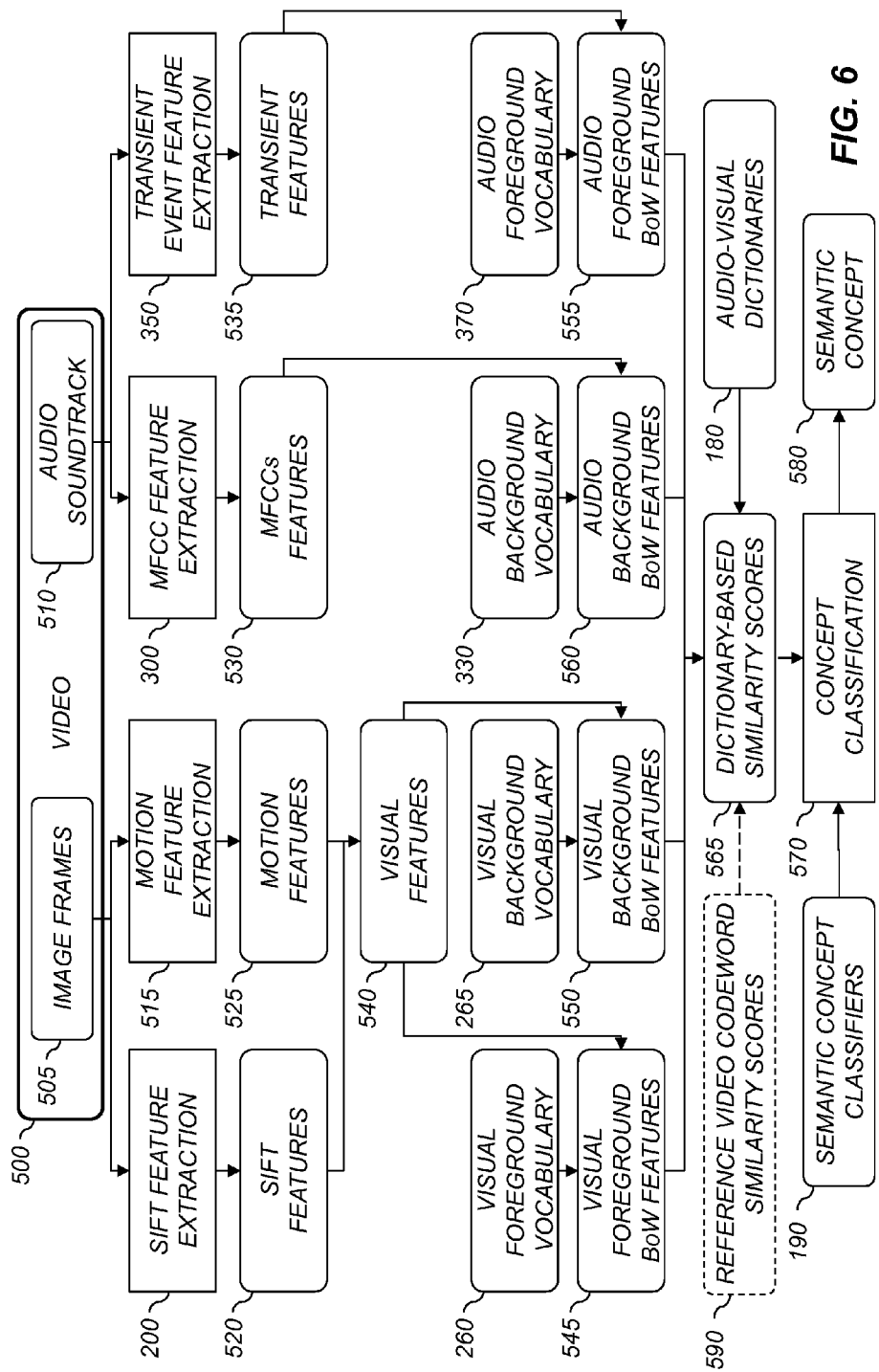
FIG. 6 is a flow diagram for determining a semantic concept classification for an input digital video in accordance with a preferred embodiment.

Similarly, the audio soundtrack 610 analyzed to determine audio foreground BoW features 555 (FIG. 6) corresponding to audio foreground codewords in the audio foreground vocabulary 370 (FIG. 6). Similarity scores are determined for each of the audio foreground codewords providing an indication of similarity between the audio foreground 625 feature in the audio soundtrack 610 and the audio foreground codewords in the audio foreground vocabulary 370 (e.g., audio foreground codeword #1 is assigned a similarity score of "7" in the example shown in FIG. 7A). Each audio foreground codeword similarity score gives the value of the corresponding bin in the audio foreground BoW feature 555 (e.g., the bin corresponding to audio foreground codeword #1 in the audio foreground BoW feature 555 has value "7" in the illustrated example.

The codeword similarity scores 640 are then analyzed relative to the AVGs 650 from the visual foreground audio foreground dictionary 430 to determine a set of dictionary-based similarity scores 565 representing the similarity between the video clip 600 and the AVGs 650. The dictionary-based similarity scores 565 can be computed from the codeword similarity scores 640 using any method known in the art. In one embodiment, the dictionary-based similarity score 565 for a particular AVG 650 is determined by computing average of the codeword similarity scores for the codewords that are included in the AVG 650. For example, the dictionary-based similarity score for AVG #1 can be determined by averaging the codeword similarity scores for visual foreground codeword #1, visual foreground codeword #3, audio foreground codeword #2, audio foreground codeword #4, and audio foreground codeword #5. In this case, AVG #1 is rounded to a similarity score of "3."

A similar process can be used to determine the dictionary-based similarity scores 565 for the other audio-visual dictionaries 180 (FIG. 6). Then the resulting set of dictionary-based similarity scores 565 can be fed into the concept classification step 570 (FIG. 6) to determine the semantic concept 580 for the input video clip 600 (e.g., the dictionary-based similarity scores 565 can be used to generate kernel matrices for SVM classification).

Returning to a discussion of FIG. 6, in an alternate embodiment the dictionary based similarity scores 565 are also responsive to reference video codeword similarity scores 590 for a set of reference video clips. In this case the set of reference videos are analyzed to determine corresponding visual foreground BoW features 545, visual background BoW features 550, audio foreground BoW features 555 and audio background BoW features 560. These features are then compared to the codewords in the audio-visual dictionaries 180 to determine the reference video codeword similarity scores 590. In some embodiments, the reference video codeword similarity scores 590 can be determined in a manner analogous to the method used to determine the codeword similarity scores 640 (FIG. 7A).

In some implementations, the set of reference video clips include some or all of the video clips in the set of training video clips that were analyzed during the formation of the audio-visual dictionaries 180. In some implementations, the set of reference video clips may also include video clips that were not included in the set of training video clips. It is generally desirable that the set of reference video clips include video clips that span the range of different semantic concepts 580 that the semantic concept classifiers 190 are trained to recognize.

According to this alternate embodiment, the dictionary-based similarity score 565 are reference video similarity scores that are determined relative to each reference video clip representing the similarity between the video 500 and the reference video clip responsive to the audio-visual grouplets, the codeword similarity scores and the reference video codeword similarity scores. The semantic concept classifiers 190 are trained to determine the semantic concept 580 responsive to the reference video similarity scores.

Figure 7B:
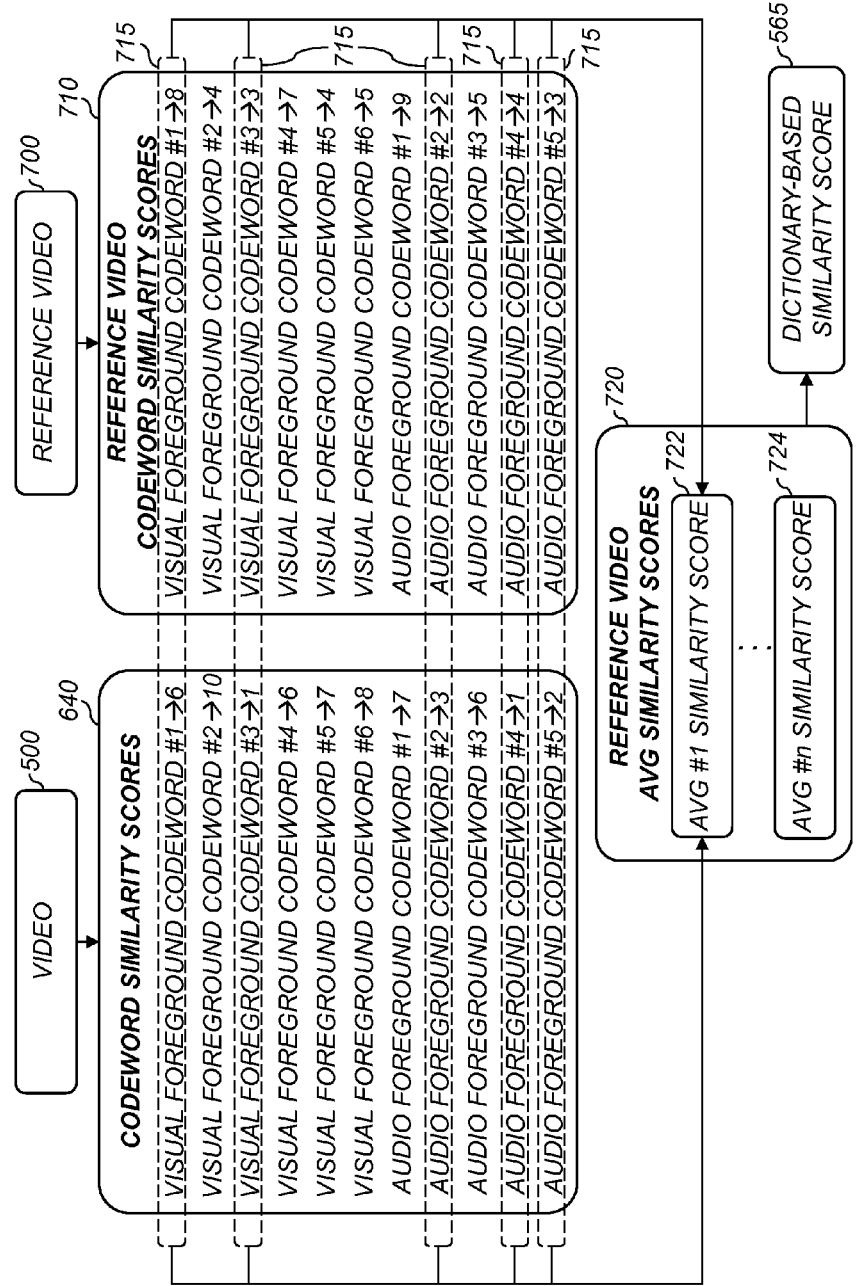
FIG. 7B is illustrates the computation of dictionary-based similarity scores according to an alternate embodiment.

There are a variety of ways that the dictionary-based similarity score 565 for each reference video clip can be determined in accordance to this alternate embodiment. One such method is illustrated in FIG. 7B. As in the method of FIG. 7A, an input video 500 is analyzed to determine visual features and audio features, which are in turn used to determine a set of codeword similarity scores 640 for each audio-visual codeword in the audio-visual dictionaries 180 (FIG. 6). Likewise, each reference video 700 is analyzed to determine visual features and audio features, which are in turn used to determine a set of reference video codeword similarity scores 710.

The codeword similarity scores 640 and the reference video codeword similarity scores 710 are then compared relative to the AVGs in the audio-visual dictionaries 180 (FIG. 6) to determine a set of AVG similarity scores 720. Each AVG similarity score 720 provides an indication of the difference between the codeword similarity scores 640 and the reference video codeword similarity scores 710 for the bins corresponding to the codewords that are included in a particular AVG. For example, AVG #1 shown in FIG. 7A includes visual foreground codeword #1, visual foreground codeword #3, audio foreground codeword #2, audio foreground codeword #4 and audio foreground codeword #5. These five AVG #1 codewords 715 are indicated with dashed outlines in FIG. 7B. The corresponding codeword similarity scores 640 and the reference video codeword similarity scores 710 for the AVG #1 codewords are then be compared to determine an AVG #1 similarity score 722. This process is repeated for each of the AVGs to determine a set of AVG similarity scores 720 (AVG #1 similarity score 722 through AVG #n similarity score 724) that together provide a comparison of the input video 500 to the reference video 700.

The AVG similarity scores 720 can be determined using any method known in the art. In one embodiment, the AVG similarity scores 720 are determined by computing a Euclidean distance between the codeword similarity scores for the codewords that are in a particular AVG. For example, the AVG#1 similarity score ($S_1$) would be given by:

$$S_1 = \sqrt{(6-8)^2+(1-3)^2+(3-2)^2+(1-4)^2+(2-3)^2} = 4.3. \quad (12)$$

In this example, a low AVG similarity score value provides an indication that the video 500 and the reference video 700 are similar relative to the features associated with the particular AVG.

In other embodiments, the AVG similarity scores 720 can be determined using other methods for characterizing differences between sets of numbers. For example, AVG similarity scores 720 can be determined by computing an average of the codeword similarity score differences, or by computing a sum of the codeword similarity score differences.

This set of AVG similarity scores 720 determined with respect to the particular reference video 700 can then be aggregated to determine the dictionary-based similarity score 565 for the reference video 700 (i.e., a "reference video similarity score"). The reference video similarity score provides a measure of the similarity between the input video 500 and the reference video 700.

The AVG similarity scores 720 can be combined in any way known in the art to determine the reference video similarity score. For example, the AVG similarity scores 720 can be combined using a simple average. In a preferred embodiment, the AVG similarity scores 720 are combined using a weighted average. The weights associated with each AVG can be determined as part of a training process in order to provide reference video similarity scores that correlate with known similarity values for a set of training videos.

The process shown in FIG. 7B is repeated for each reference video 700 in a predefined set of reference videos to determine a set of dictionary-based similarity scores 565 (i.e., reference video similarity scores). The determined dictionary-based similarity scores 565 can then be fed into the semantic concept classifiers 190 (FIG. 6) to determine one or more semantic concepts 580 (FIG. 6) for the video 500. The similarity of the video 500 to reference videos 700 having known semantic concepts can provide a strong indication of appropriate semantic concepts 580 that should be assigned to the video 500. For example, if the reference video similarity scores indicate that the video 500 has a high degree of similarity to reference videos 700 that were classified as "music performance" then the semantic concept classifiers 190 would tend to classify the video 500 using this semantic concept classification.

The current invention is different from other works such as U.S. Pat. application publication 2011/0081082 to Jiang et al., entitled "Video concept classification using audio-visual atoms," in the following aspects. The present invention extracts an Audio-Visual Grouplet (AVG) representation by analyzing the temporal correlation between audio and visual codewords. While the method of U.S. Pat. application publication 2011/0081082 learns audio-visual atoms by concatenating static audio and visual features. The current invention learns statistical temporal correlation between audio and visual codewords over a set of training videos. While the method of U.S. Pat. application publication 2011/0081082 pursues coarse-level audio-visual synchronization within an individual video. In addition, the present invention conducts foreground/background separation in both visual and audio channels while the method of U.S. Pat. application publication 2011/0081082 does not distinguish foreground and background information.

The preferred embodiment of the current invention was evaluated over the large-scale CCV set described in the aforementioned article by Jiang, et al. entitled "Consumer video understanding: A benchmark database and an evaluation of human and machine performance," which contains 9317 consumer videos collected from YouTube. These videos were captured by ordinary users under unrestricted challenging conditions, without post-editing. The original audio soundtracks are preserved, in contrast to other commonly used datasets that include news or movie videos. This enables studying legitimate audio-visual correlations. Each video in the large-scale CCV set was manually labeled to 20 semantic concepts by using Amazon Mechanical Turk. More details about the data set and category definitions can be found in the aforementioned article by Jiang et al. The experiment used similar settings to those used by Jiang et al. That is, the same training (4659 videos) and test (4658 videos) sets were used, and the same one-versus-all $\chi^2$ kernel SVM classifier was used for the semantic concept classifiers 190. The performance was measured by Average Precision (AP, the area under un-interpolated PR curve) and Mean AP (MAP, averaged AP across concepts).

Figure 8:
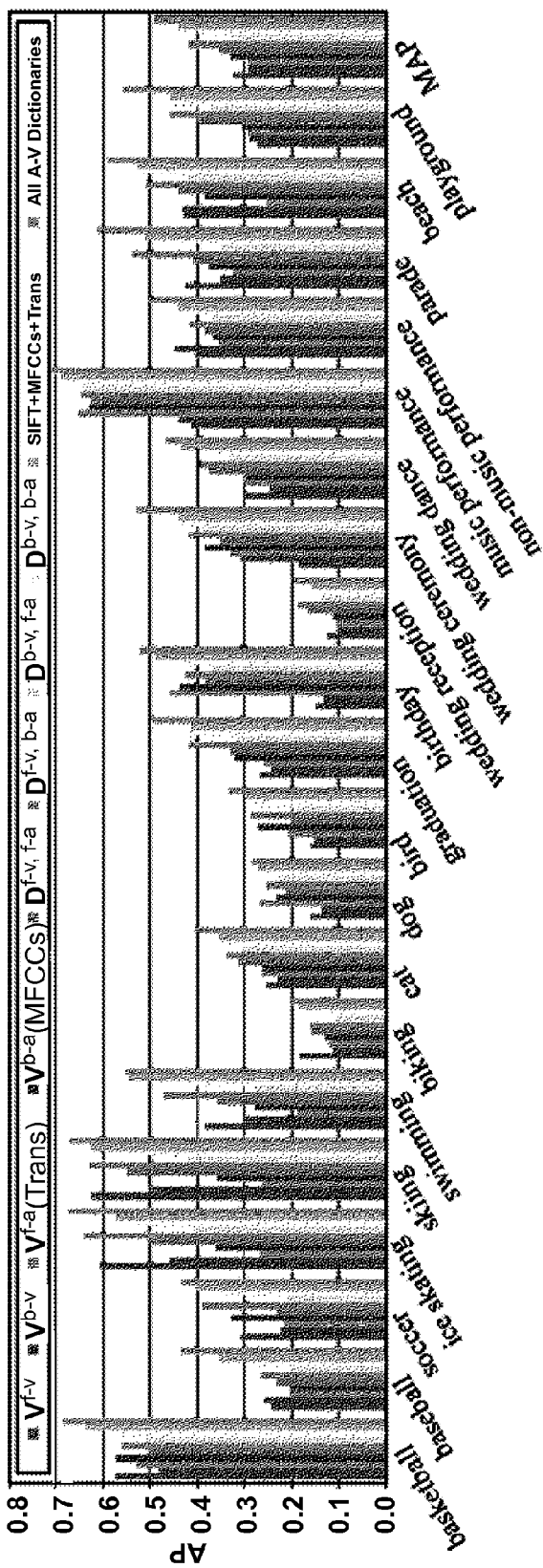
FIG. 8 is a graph comparing the performance of the present invention with some other state-of-the-art approaches.

To demonstrate the effectiveness of the proposed method, the preferred embodiment of the invention is compared with the state-of-the-art BoW representations using individual foreground and background audio and visual vocabularies ($V^{f-v}$, $V^{b-v}$, $V^{f-a}$ and $V^{b-a}$), as well as their early-fusion combinations. The AP results are shown in FIG. 8. In accordance with the preferred embodiment, the four types of audio-visual dictionary-based features ($D^{f-v,f-a}$, $D^{b-v,f-a}$, $D^{f-v,b-a}$ and $D^{b-v,b-a}$) are concatenated together to train semantic concept classifiers 190, which is the "All A-V Dictionaries" approach shown in FIG. 8.

From FIG. 8, for individual vocabularies, the visual foreground vocabulary ($V^{f-v}$) performs better than the visual background vocabulary ($V^{b-v}$), in general, while the audio background vocabulary ($V^{b-a}$) performs better than the audio foreground vocabulary ($V^{f-a}$). Such results are reasonable, because of the importance of the visual foreground in classifying objects and activities, as well as the effectiveness of audio background environmental sounds in classifying general concepts as shown by previous literatures. Compared with the visual foreground, visual background wins for the "wedding ceremony" and "non-music performance" semantic concepts; this is because of the importance of the background settings for these concepts (e.g., the arch, flower boutique, and seated crowd for "wedding ceremony," and the stadium or stage setting for "non-music performance"). In the audio aspect, audio foreground outperforms audio background over three concepts: "dog," "birthday," and "music performance"; this is because of the usefulness of capturing consistent foreground sounds for these semantic concepts. By combining the individual features via early fusion ("SIFT+ MFCCs+Trans"), compared with individual features, all concepts show improvements in the AP scores, and the MAP is improved by over 33% on a relative basis.

Through exploiting the temporal audio-visual correlation, the audio-visual dictionaries generally outperform the corresponding individual audio or visual vocabularies. For example, the MAP of the visual foreground audio foreground dictionary ($D^{f-v,f-a}$) outperforms those of visual foreground vocabulary ($V^{f-v}$) and the audio foreground vocabulary ($V^{f-a}$) by more than 10%, the MAP of the visual background audio background dictionary ($D^{b-v,b-a}$) outperforms those of the visual background vocabulary ($V^{b-v}$) and the audio background vocabulary ($V^{b-a}$) by more than 20%. By combining all types of dictionaries together, all concepts get consistent, significant AP improvements compared with individual audio or visual vocabularies, and the overall MAP is improved by more than 50%. In addition, compared with direct multimodal fusion without temporal audio-visual correlation (i.e., "SIFT+MFCCs+Trans"), the "All A-V Dictionaries" approach developed in accordance with the present invention has consistent AP gains over all concepts, with a 12% MAP gain overall. For 12 concepts (e.g., "baseball," and "ice skating") the APs are improved by more than 10%. The results demonstrate the effectiveness of the method of the present invention relative to prior art methods for determining semantic concepts for videos.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

| | |
|---|---|
| 10 | data processing system |
| 20 | peripheral system |
| 30 | user interface system |
| 40 | data storage system |
| 100 | video |
| 105 | shot boundary detection step |
| 110 | bad shot elimination step |
| 115 | video shot |
| 120 | image sequence |
| 125 | audio soundtrack |
| 130 | visual processing module |
| 140 | visual foreground temporal feature |
| 145 | visual background temporal feature |
| 150 | audio processing module |
| 160 | audio foreground temporal feature |
| 165 | audio background temporal feature |
| 170 | audio-visual temporal causal analysis module |
| 180 | audio-visual dictionaries |
| 182 | extract features step |
| 185 | dictionary-based features |
| 187 | train classifiers step |
| 190 | semantic concept classifiers |
| 200 | SIFT feature extraction step |
| 205 | SIFT feature matching step |
| 210 | sift point tracks |
| 215 | feature vectors |
| 220 | hierarchical clustering step |
| 225 | candidate foreground SIFT point tracks |
| 230 | candidate background SIFT point tracks |
| 235 | refine SIFT point tracks step |
| 240 | spatiotemporal image representation |
| 245 | foreground SIFT point tracks |
| 250 | background SIFT point tracks |
| 255 | clustering step |
| 256 | clustering step |
| 260 | visual foreground vocabulary |
| 265 | visual background vocabulary |
| 270 | visual foreground BoW features |
| 275 | visual background BoW features |
| 300 | MFCCs feature extraction step |
| 310 | MFCCs feature |
| 320 | clustering step |
| 330 | audio background vocabulary |
| 340 | audio background BoW features |
| 350 | transient event feature extraction step |
| 360 | transient feature |
| 365 | clustering step |
| 370 | audio foreground vocabulary |
| 380 | audio foreground BoW features |
| 400 | compute nonparametric Granger causality step |
| 410 | causal matrices |
| 420 | spectral clustering step |
| 430 | visual foreground audio foreground dictionary |
| 440 | visual foreground audio background dictionary |
| 450 | visual background audio foreground dictionary |
| 460 | visual background audio background dictionary |
| 500 | video |
| 505 | image frames |
| 510 | audio soundtrack |
| 515 | motion feature extraction step |
| 520 | SIFT features |
| 525 | motion features |
| 530 | MFCCs features |
| 535 | transient features |
| 540 | visual features |
| 545 | visual foreground BoW features |
| 550 | visual background BoW features |
| 555 | audio foreground BoW features |
| 560 | audio background BoW features |
| 565 | dictionary-based similarity scores |
| 570 | concept classification step |
| 580 | semantic concept |
| 590 | reference video codeword similarity scores |
| 600 | video clip |
| 605 | image frames |
| 610 | audio soundtrack |
| 615 | visual foreground |
| 620 | visual background |
| 625 | audio foreground |
| 630 | audio background |
| 640 | codeword similarity scores |
| 650 | AVG |
| 700 | reference video |
| 710 | reference video codeword similarity scores |
| 715 | AVG #1 codewords |
| 720 | AVG similarity scores |
| 722 | AVG #1 similarity score |
| 724 | AVG #n similarity score |

The invention claimed is:

1. A method for determining a semantic concept classification for a digital video clip including a temporal sequence of video frames and a corresponding audio soundtrack, comprising:

determining, by a processing device, reference video codeword similarity scores for each reference video clip in a set of reference video clips, wherein the determining reference video codeword similarity scores comprises:

analyzing a temporal sequence of video frames for a particular reference video clip to determine a set of reference video visual features;

analyzing an audio soundtrack for the particular reference video clip to determine a set of reference video audio features;

comparing the set of reference video visual features to distinct visual background codewords and distinct visual foreground codewords from audio-visual grouplets of an audio-visual dictionary, wherein the audio-visual grouplets include distinct visual background codewords representing visual background content, distinct visual foreground codewords representing visual foreground content, distinct audio background codewords representing audio background content, and distinct audio foreground codewords representing audio foreground content; and comparing the set of reference video audio features to the distinct audio background codewords and the distinct audio foreground codewords from the audio-visual grouplets of the audio-visual dictionary;

determining, by the prosessing device, codeword similarity scores for the digital video clip, wherein the determining codeword similarity scores comprises:

analyzing the temporal sequence of video frames in the digital video clip to determine a set of visual features;

analyzing the audio soundtrack in the digital video clip to determine a set of audio features;

comparing the set of visual features to the distinct visual background codewords and the distinct visual foreground codewords; and comparing the set of audio features to the distinct audio background codewords and the distinct audio foreground codewords;

determining, by the prosessing device, a reference video similarity score for each reference video clip representing a similarity between the digital video clip and the respective reference video clip responsive to the audio-visual grouplets, the codeword similarity scores, and the reference video codeword similarity scores;

determining, by the prosessing device, a concept classification using trained semantic classifiers responsive to the determined reference video similarity scores;

storing, by the prosessing device, an indication of the concept classification in a processor-accessible memory;

wherein the distinct visual background codewords and the distinct foreground codewords are separate and distinct from each other, wherein the distinct audio background codewords and the distinct audio foreground codewords are separate and distinct from each other, and wherein the distinct visual background codewords and the distinct visual foreground codewords are separate and distinct from the distinct audio background codewords and the distinct audio foreground codewords.

2. The method of claim 1, wherein the set of visual features comprises temporal visual features.

3. The method of claim 1, wherein the set of visual features incorporate SIFT features and motion features, 4. The method of claim 1, wherein the set of audio features comprises temporal audio features.

5. The method of claim 1, wherein the set of audio features comprises Mel-Frequency Cepstral Coefficients features and transient features.

6. The method of claim 5, further comprising comparing the Mel-Frequency Cepstral Coefficients features to the audio background codewords; and comparing the transient features to the audio foreground codewords.

7. The method of claim 1, further comprising training the semantic concept classifiers by:
receiving a set of training video clips having predefined semantic concepts;
determining reference video similarity scores between the training video clips and the set of reference video clips; and
training the semantic concept classifiers based on the reference video similarity scores.

8. The method of claim 1, further comprising determining the audio-visual dictionary by:
receiving a set of training video clips, each including a temporal sequence of video frames and a corresponding audio soundtrack;
generating a set of visual features including visual foreground features and visual background features from the video frames in the set of training video clips;
generating a set of audio features including audio foreground features and audio background features from the audio soundtracks in the set of training video clips;
computing temporal audio-visual correlations between the visual features and audio features;
generating a set of audio-visual grouplets based upon the temporal audio-visual correlations; and
forming the audio-visual dictionary including the set of audio-visual grouplets, together with the visual foreground features, visual background features, audio foreground features and audio background features associated with the audio-visual grouplets.

9. The method of claim 8, wherein each of the visual foreground features is a sequence of histograms describing the occurrence of a visual foreground codeword in a sequence of video frames.

10. The method of claim 8, wherein each of the visual background features is a sequence of histograms describing the occurrence of a visual background codeword in a sequence of video frames.

11. The method of claim 8, wherein each of the audio foreground features is a sequence of histograms describing the occurrence of an audio foreground codeword in a sequence of short-term audio windows in the audio soundtrack.

12. The method of claim 8, wherein each of the audio background features is a sequence of histograms describing the occurrence of an audio background codeword in a sequence of short-term audio windows in the audio soundtrack.

13. The method of claim 8, wherein the temporal audio-visual correlations include correlations between the visual foreground features and the audio foreground features; correlations between the visual foreground features and the audio background features, correlations between the visual background features and the audio foreground features, or correlations between the visual background features and the audio background features.

14. The method of claim 8, wherein the temporal audio-visual correlations between the visual features and audio features comprise statistical temporal causalities.

15. The method of claim 14, wherein the statistical temporal causalities comprise Granger causalities.

16. The method of claim 8, wherein spectral clustering is used to generate the audio-visual grouplets based upon the temporal audio-visual correlations.

17. The method of claim 1, wherein each of the audio-visual grouplets includes a set of the distinct, visual foreground codewords or distinct visual background codewords and a set of the distinct audio foreground codewords or distinct audio background codewords.

18. The method of claim 1, wherein each of the distinct visual foreground codewords is from a visual foreground vocabulary that is generated based upon the visual foreground content of the plurality of training video chips.

19. The method of claim 1, wherein each of the distinct visual background codewords is from a visual background vocabulary that is generated based upon the visual background content from the plurality of training video chips.

20. The method of claim 1, wherein each of the distinct audio foreground codewords is from an audio foreground vocabulary that is generated based upon the audio foreground content from the audio soundtracks of the plurality of training video chips.

21. The method. of claim 1, wherein each of the distinct audio background codewords is from an audio background vocabulary that is generated based upon the audio background content of the plurality of training video chips.

22. The method of claim 1, wherein the determining the reference video similarity score comprises:
determining audio-visual grouplet similarity scores for a set of audio visual grouplets representing a similarity between the codeword similarity scores and the corresponding reference video codeword similarity scores for the particular reference video clip; and
aggregating the audio-visual grouplet similarity scores to determine the reference video similarity score for the particular reference video clip.

23. The method of claim 22, wherein the audio-visual grouplet similarity scores are determined by computing a Euclidean distance between the codeword similarity scores and the corresponding reference video codeword similarity scores for the particular reference video clip.

24. The method of claim 22, wherein the audio-visual grouplet similarity scores are aggregated by computing an average or a weighted average of the audio-visual grouplet similarity scores.

25. A system for determining a semantic concept classification for a digital video clip including a temporal sequence of video frames and a corresponding audio soundtrack comprising a processing device comprising one or more processors and a processor accessible memory, the processing device configured to:

determining reference video codeword similarity scores for each reference video clip in a set of reference video clips, wherein the determining reference video codeword similarity scores comprises:

analyzing a temporal sequence of video frames for a particular reference video clip to determine a set of reference video visual features;

analyzing an audio soundtrack for the particular reference video clip to determine a set of reference video audio features;

comparing the set of reference video visual features to distinct visual background codewords and distinct visual foreground codewords from audio-visual grouplets of an audio-visual dictionary, wherein the audio-visual grouplets include distinct visual background codewords representing visual background content, distinct visual foreground codewords representing visual foreground content, distinct audio background codewords representing audio background content, and distinct audio foreground codewords representing audio foreground content; and comparing the set of reference video audio features to the distinct audio background codewords and the distinct audio foreground codewords from the audio-visual grouplets of the audio-visual dictionary;

determining codeword similarity scores for the digital video clip, wherein the determining codeword similarity scores comprises:

analyzing the temporal sequence of video frames in the digital video clip to determine a set of visual features;

analyzing the audio soundtrack in the digital video clip to determine a set of audio features;

comparing the set of visual features to the distinct visual background codewords and the distinct visual foreground codewords; and comparing the set of audio features to the distinct audio background codewords and the distinct audio foreground codewords;

determine a reference video similarity score for each reference video clip representing a similarity between the digital video clip and the respective reference video clip responsive to the audio-visual grouplets, the codeword similarity scores, and the reference video codeword similarity scores;

determine concept classification using trained semantic classifiers responsive to the determined reference video similarity scores; and store indications of the one or more semantic concept classifications; wherein the distinct visual background codewords and the distinct foreground codewords are separate and distinct from each other, wherein the distinct audio background codewords and the distinct audio foreground codewords are separate and distinct from each other, and wherein the distinct visual background codewords and the distinct visual foreground codewords are separate and distinct from the distinct audio background codewords and the distinct audio foreground codewords.

26. A non-transitory computer-readable medium having instructions stored thereon for determining a semantic concept classification for a digital video clip including a temporal sequence of video frames and a corresponding audio soundtrack, the instructions comprising:

instructions to determine reference video codeword similarity scores for each reference video clip in a set of reference video clips, wherein the determining reference video codeword similarity scores comprises:

instructions to analyze a temporal sequence of video frames for a particular reference video clip to determine a set of reference video visual features;

instructions to analyze an audio soundtrack for the particular reference video clip to determine a set of reference video audio features;

instructions to compare the set of reference video visual features to distinct visual background codewords and distinct visual foreground codewords from audio-visual grouplets of an audio-visual dictionary, wherein the audio-visual grouplets include distinct visual background codewords representing visual background content, distinct visual foreground codewords representing visual foreground content, distinct audio background codewords representing audio background content, and distinct audio foreground codewords representing audio foreground content; and instructions to compare the set of reference video audio features to the distinct audio background codewords and the distinct audio foreground codewords from the audio-visual grouplets of the audio-visual dictionary;

instructions to determine codeword similarity scores for the digital video clip, wherein the determining codeword similarity scores comprises:

instructions to analyze the temporal sequence of video frames in the digital video clip to determine a set of visual features;

instructions to analyze the audio soundtrack in the digital video clip to determine a set of audio features;

instructions to compare the set of visual features to the distinct visual background codewords and the distinct visual foreground codewords; and instructions to compare the set of audio features to the distinct audio background codewords and the distinct audio foreground codewords;

instructions to determine a reference video similarity score for each reference video clip representing a similarity between the digital video clip and the respective reference video clip responsive to the audio-visual grouplets, the codeword similarity scores, and the reference video codeword similarity scores;

instructions to determine concept classification using trained semantic classifiers responsive to the determined reference video similarity scores; and instructions to store indications of the one or more semantic concept classifications in a processor-accessible memory;

wherein the distinct visual background codewords and the distinct foreground codewords are separate and distinct from each other, wherein the distinct audio background codewords and the distinct audio foreground codewords are separate and distinct from each other, and wherein the distinct visual background codewords and the distinct visual foreground codewords are separate and distinct from the distinct audio background codewords and the distinct audio foreground codewords.

* * * * *